(No Model.) 2 Sheets—Sheet 1.
S. C. C. CURRIE.
AUTOMATIC CUT-OUT FOR SECONDARY BATTERIES.
No. 401,332. Patented Apr. 16, 1889.
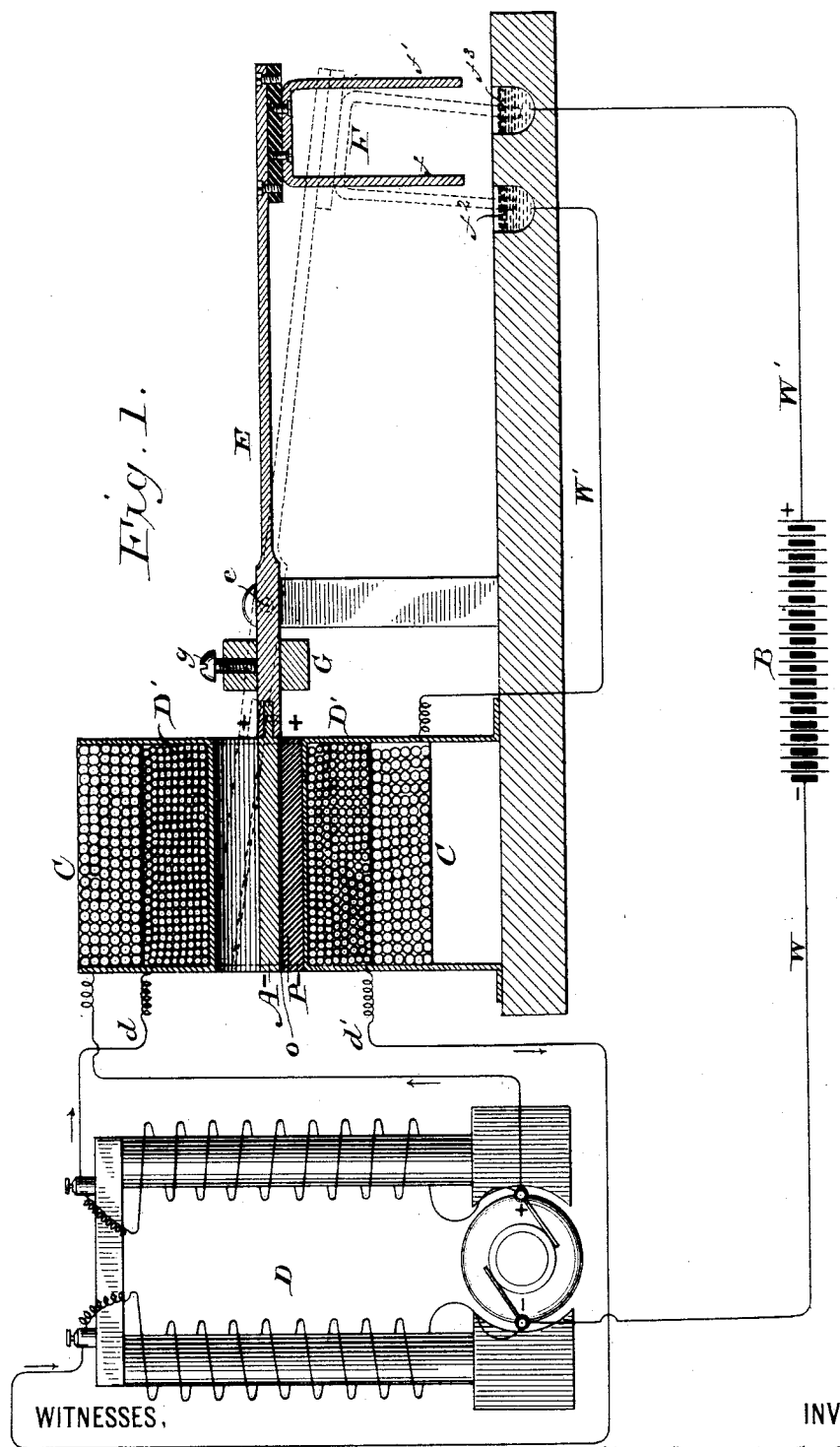

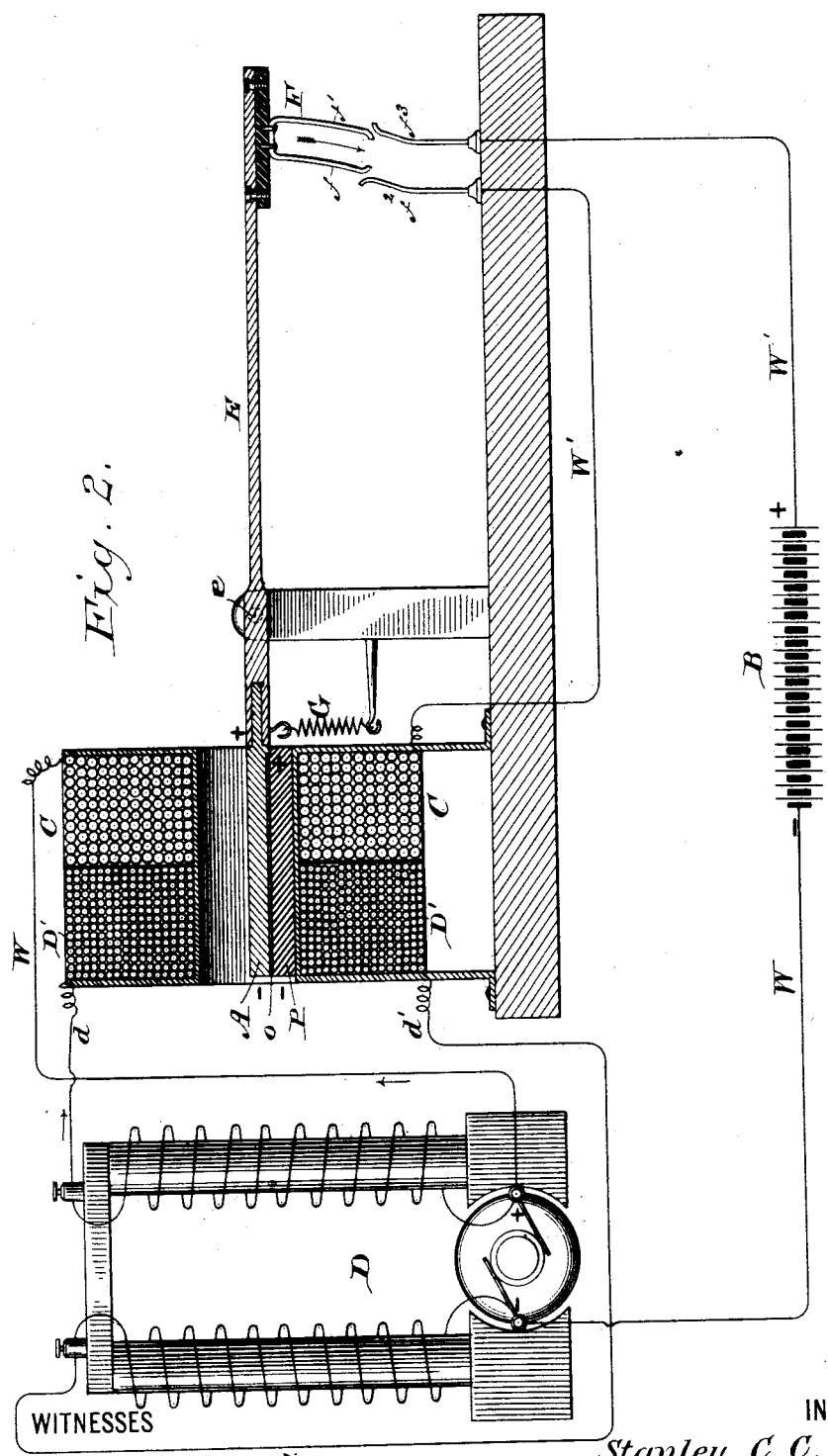

UNITED STATES PATENT OFFICE.

STANLEY C. C. CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

AUTOMATIC CUT-OUT FOR SECONDARY BATTERIES.

SPECIFICATION forming part of Letters Patent No. 401,332, dated April 16, 1889.

Application filed November 26, 1888. Serial No. 291,332. (No model.)

*To all whom it may concern:*

Be it known that I, STANLEY C. C. CURRIE, a subject of the Queen of Great Britain, now residing in the city and county of Philadelphia, in the State of Pennsylvania, have invented certain new and useful Improvements in Automatic Circuit-Controllers for Electric Circuits, of which the following is a specification.

My invention relates to that class of apparatus in which the current is subject to changes of direction or sudden reversals of polarity incident to changes of electro-motive force in different members of the apparatus relatively to each other—as, for instance, in the case of dynamo-electric machines coupled in multiple arc or a dynamo and accumulator in the same circuit.

The objects of my invention are so to organize the apparatus as to secure its prompt and effective action at all times, combined with simplicity of construction. These ends I attain by combining with the main circuit of a dynamo-electric machine an accumulator or equivalent device, a coil of comparatively thick wire influencing a magnet, and an armature controlling the main circuit but energized by a separate coil of comparatively fine wire in circuit with the dynamo.

The subject-matter of my invention is hereinafter specifically designated.

The accompanying drawings represent so much only of my improved apparatus as is necessary to illustrate the subject-matter claimed. The details of construction, being old and well known, unless otherwise indicated, need no particular description.

Figure 1 represents a diagrammatic elevation, partly in longitudinal section, of one form of apparatus; and Fig. 2, a similar view of a modified organization.

The drawings show an ordinary shunt-wound dynamo, D, with an accumulator or secondary battery, B, included in its main circuit, W W', which circuit also comprises a tubular coil, C, of comparatively coarse wire. A similar coil, D', of comparatively fine wire, is included in a separate circuit, d d', connected with the poles of the dynamo, being shown, in fact, as placed in the field-circuit of the shunt-wound dynamo. In Fig. 1 this fine coil D' is shown as encircled by the coarse coil C and as encircling within its bore or cavity a fixed bar-magnet, P, preferably a permanent one, as the use of such a magnet prevents the reversals of polarity incident to the use of soft-iron cores when acted upon by reverse currents, as hereinafter more fully explained. A thin sheet or strip, o, of diamagnetic metal—such as brass, for instance—separates this bar-magnet from a movable core or armature, A, preferably of soft iron, mounted on an arm or lever, E, preferably of non-magnetic or diamagnetic material, rocking on a pivot, e, and provided with a counterpoise, G, which tends normally to hold the armature close to the magnet P, as shown in full lines in Fig. 1, which counterpoise may be adjusted and held in position by a set-screw, g. The opposite end of the rocking arm E carries an insulated fork, F, of conducting material, the prongs $f$ $f'$ of which when depressed can rest in mercury-cups $f^2$ $f^3$ in the main circuit, which normally remains open.

Fig. 2 shows the circuit-closing device as consisting of abutting-springs $f$ $f'$ $f^2$ $f^3$, a spring, G, as constituting the counterpoise, and the coils C D', as wound parallel and end to end, instead of one within the other, these being all well-known equivalents.

The coils, armature, and magnets, it will be observed, are all of substantially the same length in Fig. 1, the winding being equivalently increased in the coils shown in Fig. 2.

The following is a description of the operation of the apparatus, the object, it will be understood, being to complete the main circuit whenever the electro-motive force of the dynamo exceeds that of the accumulator, and to maintain this position as long as their relative condition remains unchanged, and promptly to open the main circuit and thus cut out the dynamo whenever the electro-motive force of the accumulator exceeds that of the dynamo, thus preventing the injurious action of reverse currents. When no current traverses the coils C D', the armature A is normally attracted by the permanent magnet P and held close thereto. This lifts the forks $ff'$ and breaks the main circuit, as shown. Now, when the dynamo starts, as soon as its electro-motive force rises to the requisite intensity in excess of that of the battery, the fine wire coil D', being properly wound for that purpose, creates in the armature A magnetism similar in polarity to that of the permanent magnet P. The armature consequently is repelled by the magnet and forced to the opposite side of the cavity in the coils. The intensity of the field-magnets, or, in other words, the electro-motive force required to do this work, can be regulated by adjusting the counterpoise G, as hereinbefore explained. This repulsion of the armature closes the main circuit, as shown in dotted lines in Fig. 1, by inserting the forks in the mercury-cups. As the coarse coil C, which is included in the main circuit, is wound correspondently with the fine coil D', both co-operate in actuating the armature, and in maintaining the magnetism of the permanent magnet P, and the main circuit remains closed as long as this condition exists. Now, should the electro-motive force of the dynamo diminish from any cause until it only equaled that of the accumulator, the current in the coarse coil C would cease or fall to zero, while the current in the fine coil would be insufficient to maintain the repulsion of the armature, which would promptly fall, and thus break the main circuit. On the other hand, should the battery-current become so strong as to reverse the current in the main circuit, the polarity of the coarse coil C would at once become opposed to that of the fine coil D', and the preponderating influence of the permanent magnet P would at once attract the armature and break the main circuit. This property constitutes the main reason for the use of a permanent magnet, as it retains its polarity instead of having it reversed by reversals of the current. Ordinarily the currents of the coils C D' re-enforce the polarity of the permanent magnetism, and thus prevent its loss or change.

The advantages of utilizing the repulsive force of the magnets and currents instead of operating normally by attraction, as heretofore, is so great and so obvious as readily to be appreciated by those skilled in the art, when indicated.

When operating by attraction, sudden and large reversals of polarity frequently result in still retaining the circuit closed; but with my organization such a result is practically impossible, as both the currents and permanent magnets coact to open the circuit.

Another advantage incident to my organization is that the currents are so regulated that the action of the fine coil alone is just sufficient to close the contacts or immerse the points of the fork into the mercury-cups, the buoyancy of which prevents deep immersion until the large coil or main current acts. When the forks become deeply immersed and full contact is assured, the larger the current the deeper the immersion and the better and larger the contact. As the main current decreases, the immersion of the contacts decreases until at the moment when the current ceases they barely touch, and the circuit can quickly and readily be broken. To this advantageous mode of operation the repulsive organization essentially contributes. I have practically demonstrated with such an apparatus that contact breaks when the pressure or electro-motive force of the generator and accumulator is balanced, and that the contact breaks so gradually as effectually to prevent sparking. The manner in which this automatic breaking of the main circuit prevents injurious effects on the dynamo is well understood, and various ways of attaining this result heretofore have been devised. I do not, therefore, broadly claim attaining this result; nor do I broadly claim breaking a main circuit by an armature controlled by a separate circuit.

Having thus fully described the organization and operation of my improved automatic circuit-controller, what I claim therein as new, and desire to secure by Letters Patent, is—

1. The combination, substantially as hereinbefore set forth, of a dynamo-electric machine, an accumulator, and an energizing-coil, all in the main circuit, a second energizing-coil (in a separate or branch circuit) adjacent to and parallel with the main-circuit coil, a permanent magnet within said coils, a soft-iron armature, also within said coils, and a circuit-controller or switch in the main circuit controlled by said armature.

2. The combination, substantially as hereinbefore set forth, of a shunt-wound dynamo, an accumulator, and an energizing-coil, all in the main circuit, a second energizing-coil (in a constantly-closed field-circuit) coincident with the main-circuit coil, an armature vibrating within both coils, a permanent magnet actuating the armature, and the main-circuit switch controlled by said armature.

3. The combination, substantially as hereinbefore set forth, of a dynamo, an accumulator, and an energizing-coil of coarse wire, all in the main circuit, a second energizing-coil of fine wire, (in a separate or branch circuit,) a permanent magnet and an armature both inclosed by the coils, and the main-circuit switch controlled by the armature.

4. The combination, substantially as hereinbefore set forth, of the main-circuit coil, the branch-circuit coil coincident therewith, the permanent magnet and the soft-iron armature both inclosed by the coils, and the main-circuit switch controlled by the armature.

5. The combination, substantially as hereinbefore set forth, of the main-circuit coil, the concentric coacting branch-circuit coil, the permanent magnet inclosed therein, the armature vibratable laterally relatively to the permanent magnet, and the interposed diamagnetic plate which prevents the adhesion of the magnet and armature.

6. The combination, substantially as hereinbefore set forth, of the coacting concentric coils, the permanent magnet therein, the armature vibratable within the coils, the arm, pivot, and counterpoise of the armature, and the circuit-controller carried by said arm.

7. The automatic circuit-controller hereinbefore described, consisting of the combination of a dynamo, an accumulator, and an energizing-coil, all in the main circuit, a second energizing-coil, (in a separate or branch circuit,) concentric and coacting with the main coil, a permanent magnet within said coils, an armature vibratable therein, an arm on which said armature is mounted, a pivot on which said armature rocks, a counterpoise normally holding said magnet and armature together, and a switch controlling the main circuit, also mounted on said arm and controlled by the vibrations of the armature, substantially as hereinbefore set forth.

8. The combination, substantially as hereinbefore set forth, of the energizing-coil, its fixed permanent magnet-core, and its movable soft-iron armature, normally similarly polarized and vibratable laterally within the coil.

In testimony whereof I have hereunto subscribed my name.

STANLEY C. C. CURRIE.

Witnesses:
 FRANCIS D. LEWIS,
 MORRIS R. BOCKIUS.